United States Patent [19]

Camp et al.

[11] Patent Number: 4,844,431
[45] Date of Patent: Jul. 4, 1989

[54] PNEUMATIC GAS METER TEST FIXTURE

[75] Inventors: Marion L. Camp; James W. Lancaster, both of Sheridan, Ark.

[73] Assignee: Arkansas Lousisiana Gas Company, Little Rock, Ark.

[21] Appl. No.: 212,921

[22] Filed: Jun. 29, 1988

[51] Int. Cl.[4] .............................................. B23Q 1/04
[52] U.S. Cl. ..................................... 269/25; 269/71; 269/83; 269/909
[58] Field of Search .................. 403/92, 145, 149, 39; 248/278, 214; 254/126; 269/82-85, 71, 72, 45, 909, 25

[56] References Cited

U.S. PATENT DOCUMENTS

| | | | |
|---|---|---|---|
| 1,600,835 | 9/1926 | Manley | 269/71 |
| 1,634,227 | 6/1927 | Alford et al. | 269/71 |
| 1,732,081 | 10/1929 | Clement | 269/71 |
| 2,589,572 | 3/1952 | Rainwater | 254/126 |
| 2,764,380 | 9/1956 | Gumphrey | 269/82 |
| 2,991,994 | 7/1961 | Kulp | 269/84 |
| 3,186,173 | 1/1965 | Hogg | 269/25 |
| 4,507,835 | 4/1985 | Nankervis | 269/71 |
| 4,564,174 | 1/1986 | Hollingsworth | 269/83 |

*Primary Examiner*—Robert C. Watson
*Attorney, Agent, or Firm*—Stephen D. Carver

[57] ABSTRACT

A pneumatically powered test fixture for bracing, holding and/or handling solid, bulky objects such as gas meters or the like. The fixture readily permits service or repairs and renders meters readily accessible and easily maneuverable. A rigid frame is adapted to be secured to a stable workbench or support, and an optional support plate may couple the frame to the support surface. A rigid mounting spacer secured to the frame mounts a pneumatically powered trunnion. When an optional frame mounting plate is omitted, the trunnion mounting spacer will be affixed directly to the workbench. A rigid, U-shaped cradle captivates a meter to be repaired or serviced. The cradle is rotatably suspended above the supporting surface by the trunnion, and the cradle can be manually rotated into a variety of user-selectable positions to readily expose all structural portions of the meter. A pneumatic cylinder mounted at the top of the cradle engages a meter in response to pressurization independently of meter width or configuration. Thus operator adjustments ordinarily are not required to assimilate meters of varying dimensions and configurations. The trunnion, which rotatably mounts the cradle to the frame, includes an internal forcing cone which locks the trunnion shaft in response to axial displacement. Trunnion activation restrains the cradle in a given radial orientation. The trunnion assembly comprises an internal, cylindrical bearing member coupled to the cradle for enabling relative rotation. A pair of generally semi-circular disc retainer members internally disposed within the trunnion prevent permanent lock up, and enable manual cradle rotation after pneumatic trunnion release.

15 Claims, 5 Drawing Sheets

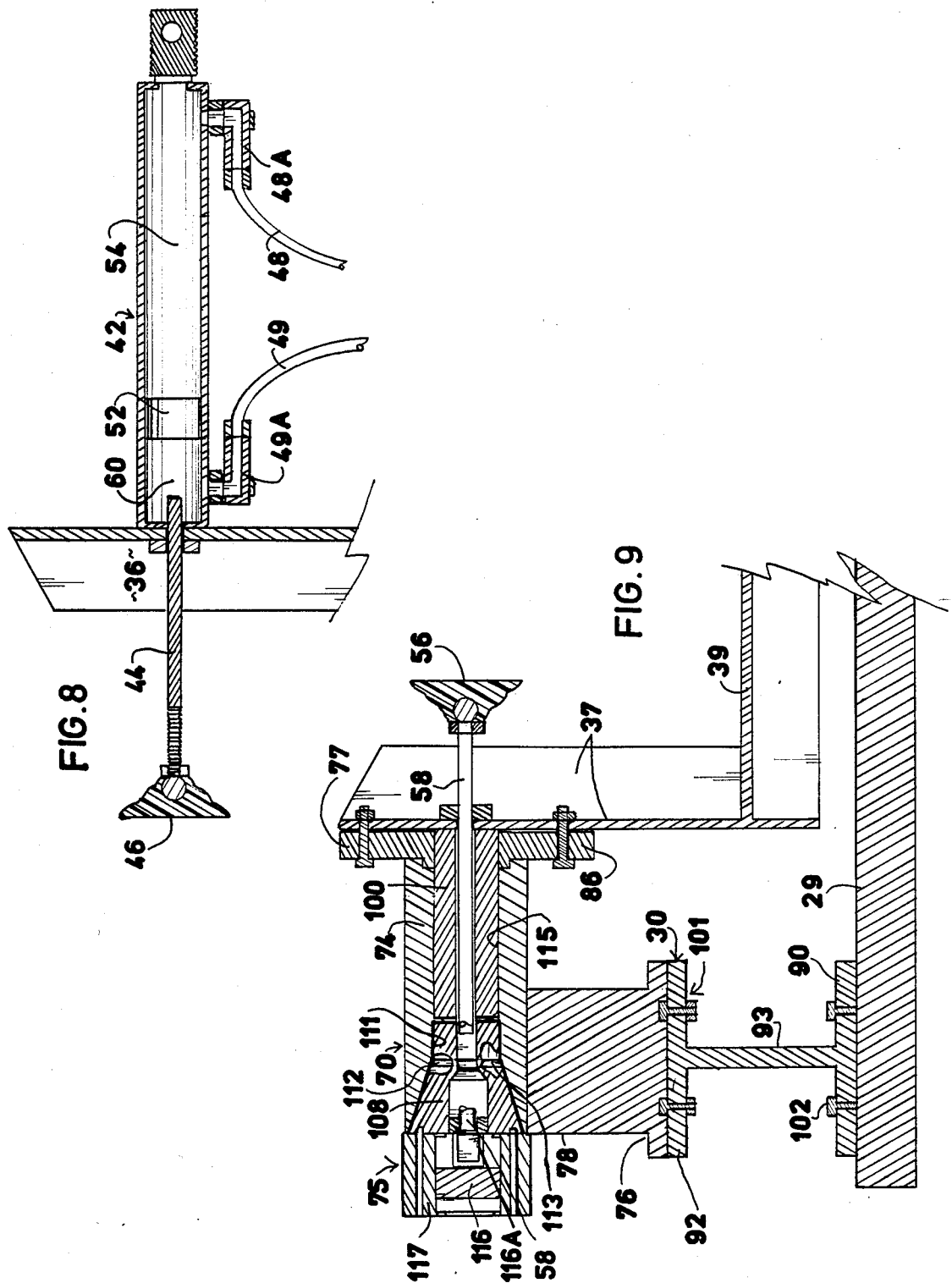

PNEUMATIC GAS METER TEST FIXTURE

BACKGROUND OF THE INVENTION

The present invention relates generally to repair stands or fixtures for temporarily bracing miscellaneous workpieces or devices. More specifically, the present invention relates to vises or stands for temporarily servicing gas meters during maintenance, repair or testing. The invention is believed best classified in U.S. utility class 29, subclass 281.4.

"Dry" or Bellows-type gas meters are widely used in domestic and commercial environments. Such meters typically comprise an outer, box-like housing having at least one gas inlet and one gas outlet. A typical gas meter may include a multiplicity of internal pressure compartments or chambers with which gas passageways are defined. The passageways are intermittently opened and closed by slide valves which may be driven by crank driven cams or other linkages. The pulsing bellows, for example, seen in U.S. Pat. No. 3,386,288 and others representative of this art, convert reciprocal motion to rotary motion. Twin chamber positive displacement meters interconnect bellows with the drive chain through flag drives or the like, to effectuate movement of the volume consumption indicator and the flow path-establishing cams.

U.S. Pat. No. 3,693,444, for example, discloses typical self stabilizing slider valves of the type activated by expanding gas meter bellows. As such slider valves open and close through reciprocal motion to expose or cover up gas passageways, the gas is transmitted from the gas meter input to the gas meter output through the intermediate bellows and passages ways. U.S. Pat. No. 3,905,231, issued Sept. 16, 1975 discloses a gas activated pressure diaphragm which causes a reciprocating motion in conjunction with a flag rod. The diaphragm therein disclosed is of the pulsating gas pressurizing type. Motion transmitting linkages employed with a valve system are opened and closed in response to linkages which drive suitable covers.

As will be recognized by those skilled in the art, differential gas pressure is utilized by the bellows to provide a metering action. The diaphragms inflate or deflate periodically in response to gas pressure. Thus, each time a chamber is filled or emptied, the meter registers passed gas volumes transmitted from the input to the output (i.e. the consumer.) Bellows type gas meters are the most common in domestic and commercial gas service. These types of meters usually include a cooperative pair of spaced-apart bellows, which operate substantially simultaneously. One compartment is usually filling while the other is emptying, but all parameters are known and are substantially uniform in order to insure a reliably metered delivery of gas. The number of times each measuring chamber is filled and emptied is registered, and thus a total volume of transmitted and consumed gas is indexed. The register is usually operated by a crank which is rotated by movement of the diaphragms. Synthetic rubber diaphragms are usually used to insure that displacement is directly proportional to stroke. A plurality of sliding valves interconnected to a central crank via suitable linkages are displaced in a cam-like motion in response to bellows inflation and deflation. Meter motion usually cannot occur unless a pressure differential, and hence gas flow takes place. Nominally a pressure differential of 0.10-inch (2.5 millimeters) of water will initiate meter actuation. Usually meter capacities vary from between 150 to 17,000 cubic feet per hour. The physical dimensions, configurations, and weights of such meters of course change accordingly. While the mechanisms involved are relatively simple, a very high degree of meter accuracy is required.

Over time a variety of parts within the meter will deteriorate. Bearings can wear out, crank linkages can deform, and leaks can develop within the bellows. Numerous other problems may occur. Exposed metal surfaces, for example, may degrade in time in response to chemical actions encouraged by metal contact with gases. Usually gas meters will be replaced at least once every 10 years. The usual practice is to completely disassemble, clean, repair and recalibrate the meter. Commercial utilities such as Arkansas Louisiana Gas Company, for example, must be able to process and hence recalibrate several thousand meters per year. Gas meters are typically bulky and cumbersome to handle. The outer housing of a typical home gas meter is irregularly shaped and may range from twelve to eighteen inches high, eight to twenty inches wide, and up to eight inches deep. Such meters typically weigh from Six to Twenty Five pounds. "Wet" type flowmeters may be much bulkier and heavier, since their inner chamber is filled with liquid. The precision linkages within the component must be isolated and safety-sealed to prevent unauthorized access to the internal workings. The fact that meter housings are sealed together greatly complicates subsequent testing or repairing of such equipment.

Routine maintenance, testing, and repair require that the meter housing be opened to permit access to the interior. It is extremely difficult to securely retain such a bulky, irregularly shaped gas meter in position upon a worktable or similar supporting surface. Moreover, once positioned with known conventional equipment, the meter cannot conveniently be moved and manipulated as required for testing, repairs, or replacement of internal working parts. To properly test or gauge the meters, for example, it is necessary to position the gas meter to permit the repairman to view both the interior and the indicating dials on the front. Hence, it is necessary and desirable to provide some means for securely retaining a gas meter in position during repairs, while readily allowing and facilitating relatively easy adjustments of the meter position or orientation.

A wide variety of vises have been suggested in the past. The most representative prior art know to us is the repair rack apparatus disclosed in U.S. Pat. No. 2,621,400, issued to C. D. Peterson, on Dec. 16, 1952. This now-ancient device has been commercially marketed successfully in the past by Universal controls Corporation. The prior art rack described essentially comprises a stationary frame which mounts a rotatable, meterreceptive cradle. A meter to be serviced is locked into position within the cradle by a manual clamp, and constant adjustments to the clamping apparatus are normally required. The cradle is secured by worm-driven clamp adapted to be manually adjusted to orient the meter device. When the meter is thus secured, the cradle may be rotated until the meter is disposed in a desired position for repair. A threaded retainer rod must then be manually tightened to hold the cradle in the desired position during use. While this device has found widespread commercial acceptance, it is slow and cumbersome in use. Time consuming, manual adjustments are repeatedly required at the individual work/repair station to successively receive and secure meters of varying sizes, shapes and configurations.

The rotatable vise described in U.S. Pat. No. 2,722,147 issued Nov. 1, 1955 comprises a closed clamp, the jaws of which are operatively linked by a rotatable, threaded rod. The jaws may be selectively opened or closed by manual adjustment of the rod to clamp the meter to be repaired. After the jaws are tightened, the tool is manually rotated into position by manipulation of a ratchet-driven rod associated with the clamp. Another manually-driven vise of some relevance to the present invention is taught by Barton, U.S. Pat. No. 3,888,476, issued June 10, 1975. The vise is mounted upon a rotatable base and includes a pair of manually adjustable, cooperating arms. Prior art devices of less relevance to the present application include the universal vise of Disse, U.S. Pat. 2,390,428; issued Dec. 4, 1945; the quick-change vise of U.S. Pat. No. 3,520,527, issued July 14, 1970 to Persson; and the work-holding stand described by Hille in U.S. Pat. No. 2,815,566 issued Dec. 10, 1957.

U.S. Pat. No. 2,054,572 issued Sept. 15, 1936 to McKenna discloses a toggle-type clamp involving an over center action, and is representative of the type of bracing and clamping mechanisms employed in conjunction with known repair vises. U.S. Pat. No. 2,456,100 also discloses a toggle clamp suitable for use in prior art workpiece holding equipment.

U.S. Pat. Nos. 2,815,566 and 1,600,835 are representative of prior art stands broadly related to the servicing of workpieces or equipment. U.S. Pat. No. 1,860,844 issued May 31, 1932 discloses a wheeled carriage adapted to secure a workpiece. U.S. Pat. No. 2,431,589 discloses a propeller stand. Vises for handling parts and rotating them into different positions are seen in U.S. Pat. Nos. 3,520,527 and 2,431,589.

However, none of the prior art retainer devices known to us provides an automatic system for quickly and reliably grabbing and retaining meters of varying configurations. Moreover, none of the prior art vises or test stands known to us provide satisfactory safety or locking mechanisms which firmly secure the meter in position substantially irregardless of the width of the meter.

SUMMARY OF THE INVENTION

The present invention discloses a pneumatically powered test fixture for reliably bracing, holding and/or handling solid, bulky objects such as gas meters or the like. The fixture readily permits service or repairs, and renders meters readily accessible and easily maneuverable.

The fixture preferably comprises a rigid frame adapted to be secured to a supporting surface provided by a stable workbench, table or the like. The frame may comprise an optional, rigid mounting plate which contacts the supporting surface, and a rigid, channel iron spacer for mounting a powered trunnion. When the optional plate is omitted, the trunnion mounting spacer will be affixed directly to the supporting surface. A generally U shaped cradle comprised of channel steel is rotatably suspended above the supporting surface. The cradle receives and retains meters to be serviced, and cradle rotation thereafter facilitates meter reorientation. It comprises a pair of spaced-apart, generally parallel, vertical members which are rigidly secured to a horizontal cradle member in surrounding relationship with respect to the meters supported and captivated within the cradle.

A pneumatic cylinder mounted at the top of the cradle projects into engagement with a meter in response to pressurization. Meter width is substantially immaterial, and operator adjustments ordinarily are not required to assimilate meters of varying dimensions and configurations. The cradle can be manually rotated into a variety of user-selectable positions, to virtually effortlessly expose all sides of the meter to the service technician.

A modified locking trunnion rotatably mounts the cradle to the frame. A forcing cone inside the trunnion locks the trunnion shaft in response to axial displacement, thereby restraining the cradle in a given radial orientation. The trunnion assembly comprises an internal, cylindrical bearing member coupled to the cradle for enabling relative rotation. A pair of generally semi-circular disc retainer members internally disposed within the trunnion prevent permanent lock up, and enable manual cradle rotation after pneumatic trunnion release.

Thus a fundamental object of the present invention is to provide a self powered test stand for facilitating the repair of domestic gas meters.

A similar basic object is to provide a test stand of the character described which will reliably and safely restrain irregular objects such as gas meters during service or repairs.

Yet another basic object of the present invention is to provide a gas meter retainer apparatus of the nature described which comprises a pneumatic locking system for safely securing a meter during repairs, adjustments or maintenance.

A still further object is to provide an improved gas meter retainer vise which employs positive locking trunnion apparatus for controlling the rotating shaft portion of the vise.

Still another object of the present invention is to provide an improved gas meter retainer apparatus which comprises a pneumatically-powered, rotatable, self-locking instrument cradle.

Yet another object of the present invention is to provide a vise system of the character described which may be quickly and conveniently employed to grasp and manipulate meters of a wide variety of sizes, weights, shapes, and configurations.

A still further object of the present invention is to provide a vise device of the character described which may be employed to manipulate gas meters, water meters, or other workpieces requiring periodic maintenance and repair.

Yet another object is to provide a vise of the character described which will automatically grasp and retain gas meters of varying widths and sizes without constant operator adjustments. It is a feature of the present invention that the preferred pneumatic cradle cylinder automatically compensates for use with varying widths of meters.

A still further object of the present invention is to provide a gas meter vise which may be employed in a high capacity meter repair and maintenance facility in a safe and reliable manner.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 8 is a fragmentary, longitudinal sectional view illustrating primarily the cradle actuation cylinder;

FIG. 9 is an enlarged, fragmentary, sectional view illustrating the trunnion construction;

Detailed Description

Figure 1:
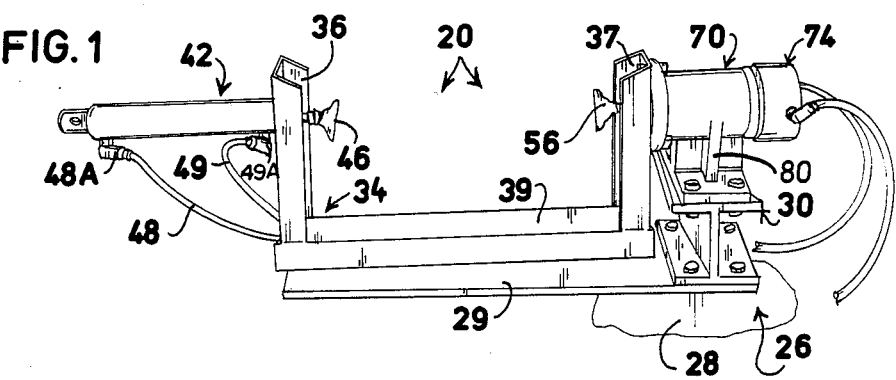
FIG. 1 is a fragmentary front perspective view of the best mode of our new PNEUMATIC GAS METER TEST FIXTURE, illustrating the optional frame support plate.
Figure 2:
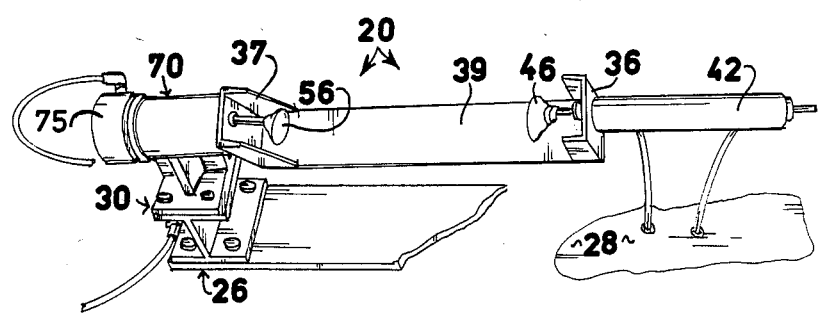
FIG. 2 is a fragmentary, rear perspective view taken from a position generally to the opposite side of that of FIG. 1, with the cradle rotated somewhat.
Figure 3:
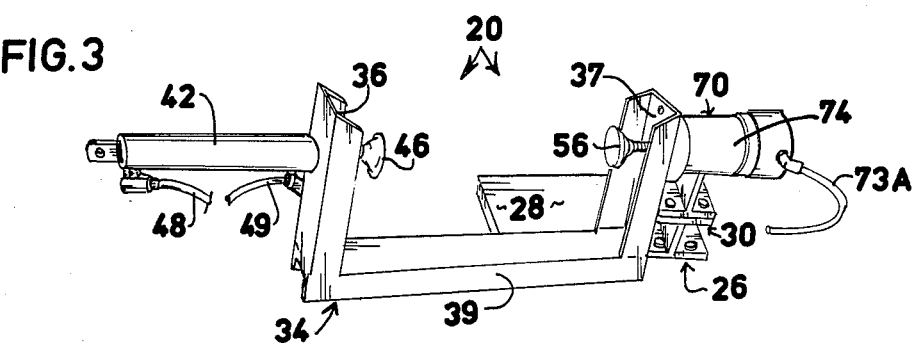
FIG. 3 is a fragmentary, perspective view similar to that of FIG. 1, but illustrating the fixture attached directly to a supportive work table, with the optional frame support plate omitted.
Figure 4:
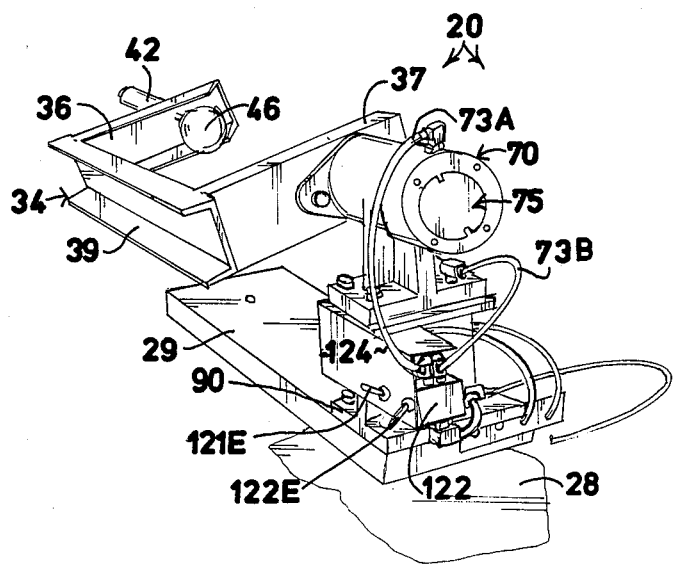
FIG. 4 is a fragmentary, rear perspective view showing the cradle rotated approximately ninety degrees, and illustrating preferred pneumatics.

With initial reference now directed to FIGS. 1-7 of the appended drawings, the test fixture 20 thereshown is adapted to reliably constrain a gas meter or the like during service or repairs. With additional reference directed to FIG. 10 the device 20 may thus constrain a conventional gas meter 22 undergoing routine service or repairs. Use of the test fixture enables the technician to quickly and easily orient the meter to be serviced in a desired, service-amenable position The frame of the test device 20 has been generally designated by the reference numeral 26. In actual operation frame 26 is adapted to be secured to a lower supporting surface 28 such as that provided by a stable workbench, work table or the like. As seen in FIGS. 1 and 2 frame 26 may include an optional, rigid mounting plate 29, which contacts the supporting surface, and a rigid, channel spacer 30. Plate 29 may be omitted as in FIG. 3, with spacer 30 being affixed directly to the work table 28

The test fixture 20 preferably includes a generally U-shaped cradle 34 comprised of channel steel which receives and retains meters to be serviced. Preferably it includes a pair of spacedapart, generally parallel members 36, 37 which are oriented generally vertically (FIG. 1) and which are of substantially similar dimensions. Members 36 and 37 are rigidly secured to the transverse horizontal member 39 of the cradle, also formed of channel steel. As will be appreciated from an inspection of FIGS. 1 and 10, for example, the cradle 34 is operatively disposed above the lower supporting surface 28 and/or the optional frame plate 29. The meter 22 is essentially supported within the cradle, and it may rest upon the horizontal member 39, being compressed between vertical cradle members 36 and 37.

A preferably pneumatic cylinder 42 is mounted near the top of vertical cradle member 36. It rigidly projects generally horizontally parallel with cradle horizontal member 39. Cylinder 42 includes an internal plunger 44 (FIGS. 8, 10) which terminates in balled fitting 46 which forcibly engages the meter 22. Pneumatic pressure applied to the cylinder apparatus 42 via line 48 activates the cylinder, and the activated plunger will forcibly extend until it contacts a meter. Meter width is immaterial, and beyond set-up, no operator adjustment need ordinarily be made to the pneumatic cylinder for it to naturally captivate meters of varying dimensions and configurations. Pneumatic control line 49 effectuates meter release. Cradle 34 can be rotated to assume a variety of positions, as will be readily apparent from an inspection of the various figures. Therefore appropriate sealed pneumatic swivel fittings such as pneumatic fittings 48A or 49A are preferably employed.

Figure 10:
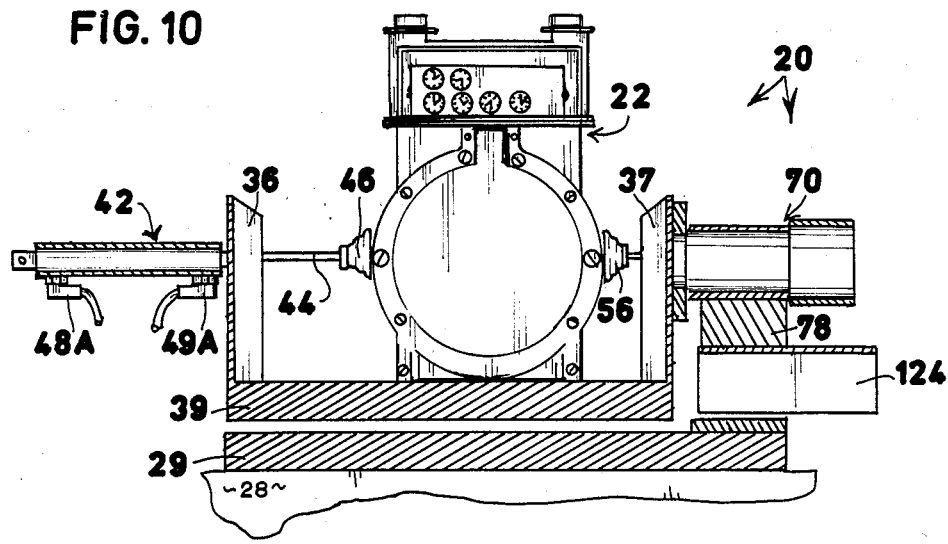
FIG. 10 is a fragmentary view illustrating a typical meter disposed upon the cradle; and, FIG. 11 is an enlarged, fragmentary, exploded view illustrating the parts employed in the best mode.

With combined reference now directed to FIGS. 8 and 10, plunger 44 of the pneumatic cylinder 42 is driven by internal piston 52 in response to suitable pressurization of the interior 54 of the cylinder. When deflected outwardly as viewed in FIGS. 8 and 10, plunger 44 drives fitting 46 into compressive engagement with the meter 22 to be serviced. Meter 22 will thus be forced against a similar fitting 56 disposed upon the opposite side of the cradle. As is apparent from FIGS. 8 and 9, both fittings 46 and 56 comprise ball-and-socket fittings so that the resilient terminal elements are swiveled with respect to the control shafts 44 or 58. The cylinder is activated in response to pressurization of interior region 54 via line 48. Similarly, plunger 44 is released for removal of a gas meter by pressurizing internal region 60 via line 49. After the meter is inserted into the cradle and pneumatically secured in a desired position the cradle may be rotated to various angular positions relative to the support surface 28 Rotation is effectuated by construction of the trunnion apparatus 70.

With primary reference now directed to FIGS. 5 and 8 through 11, a modified locking trunnion 70 is secured atop frame spacer 30. A Carr-Lane Manufacturing Company locking trunnion, which is available as an "off-the-shelf" item may be modified as described hereinafter to conform to trunnion 70. The unmodified trunnion is described in U.S. Pat. No. 3,129,937 the teachings of which are hereby incorporated by reference. In the preferred mode the Carr Lane trunnion is modified by removal of the manual thread rotated pressure-locking apparatus of the original equipment. Internally of the original equipment is a forcing cone which locks rotatable parts to ears of the shaft. Critical ingredients have been modified by the addition of travel limiting retainers 112 and 113 (FIG. 11), and a power assist is effectuated by pneumatic control 75. Actual 75 includes a piston 116 within cylinder 117 and an internal threaded fitting 116A coupled to shaft 58 (FIG. 9).

Figure 11:
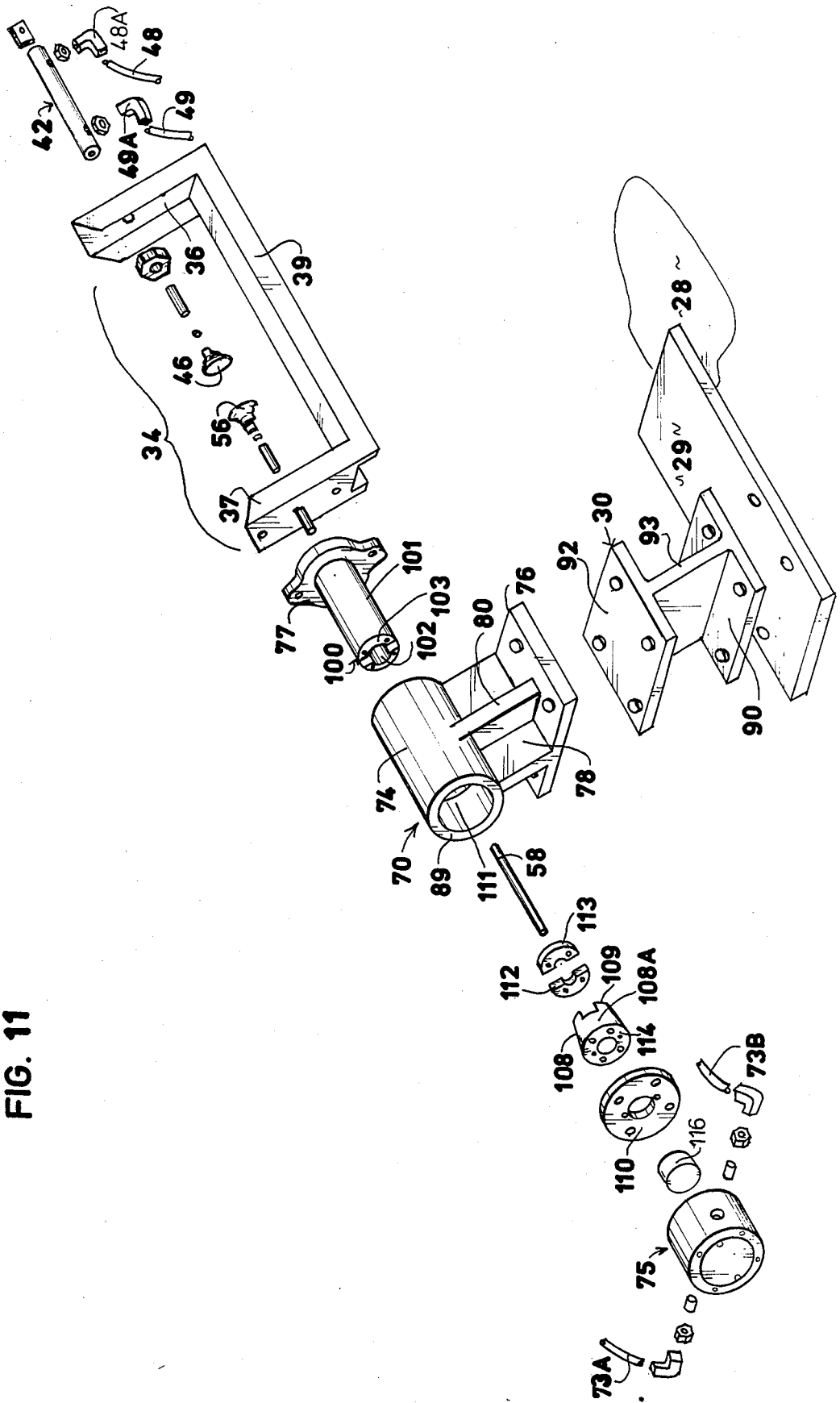

Trunnion 70 includes a rigid, generally tubular casing 74 elevated above a support plate 76 by a suitable vertical brace 78 and a pair of reinforcement webs 80. End 89 of the casing 74 is fitted to the pneumatic control 75 to be hereinafter described. As illustrated in FIG. 11, it is preferred that the trunnion apparatus 70 be firmly bolted to a supporting surface. For this purpose the channel frame spacer 30 is employed to elevate the trunnion 70 above either the optional frame plate 29 and/or the supporting surface 28. Spacer 30 includes a rigid planar flange 90 adapted to be directly secured to frame plate 29 and/or the supporting table 28, and an upper rigid plate 92 which may be rigidly secured to trunnion support plate 76. Members 90 and 92 are integral with an internal web 93. While the trunnion and frame support plate 29, 30 are preferably secured by a plurality of nut and bolt combinations 101, 102 (FIG. 9), it will be recognized by those skilled in the art that assembly can be effectuated through welding or other conventional means.

The trunnion assembly 70 includes an internal, generally cylindrical rotatable member 100 having an outer bearing surface 101 adapted to rotate within the housing 74 (FIG. 11). Flange 77 mounts against vertical member 37 of the cradle assembly. A transverse slot 1? 2 is defined across the end 103 of the bearing member 100. Internally of the housing 74 is a truncated forcing cone 108 which, as explained in U.S. Pat. No. 3,129,937, may be forced within the tapered confines of housing 74 so as to lock within the graduated internal diameter thereof. The forward projecting follower 109 on cone 108 interfits with slot 102 so that relative rotation between the members will be prohibited, but slight relative axial movements will be allowed.

The threaded, manual tightening system of U.S. Pat. No. 3,129,937 has been omitted. Instead, the pneumatic trunnion actuator 75 is secured via mounting plate 110 to the end 89 of the trunnion housing 74. With reference now to FIG. 9, the forcing cone 108 is fitted into a tapered internal diameter region 111 of the trunnion housing 74. When line 73A is pressurized, piston 116 forcibly activates cone 108. As it is forced to the right (as viewed in FIG. 9) by pneumatic piston actuate 75, it forcibly frictionally locks within the trunnion housing. Once pneumatic pressure is released from cylinder 75, the cradle releases. However, the forcing cone 108 tends to lock against shaft member 100, interfering with subsequent manual cradle maneuvering. However, easy manual movement of the cradle after trunnion release is insured by an anti-lock system which limits trunnion cone wedging.

A pair of generally semi-circular and flat retainer members 112, 113 are symmetrically fitted upon the rear end surface 103 of the shaft member 100, on opposite sides of the slot 102. As best viewed in FIGS. 9 and 11, the retainers 112, 113, have a slightly tapered outer periphery. Hence the disc retainer members gradually approach and then abut the uniform diameter region 115 (FIG. 9) defined within the interior of the trunnion casing 74. Region 115 permits the bearing shaft 100 and surface 101 to rotate relative to it. Since the retainers 112, 113 limit axial movement of the cone 108 into engagement with slot 102, subsequent release of pneumatic trunnion actuator 75 virtually immediately effects relative freedom of rotation of the cradle after pressure is released.

Figure 5:
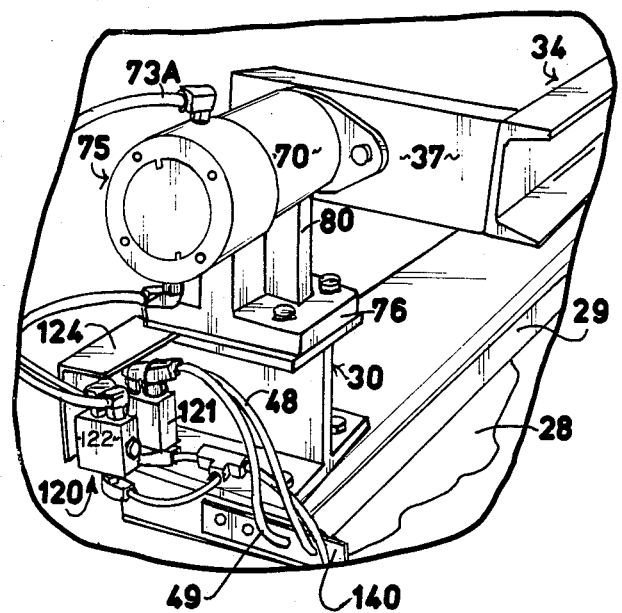
FIG. 5 is an enlarged, fragmentary, isometric view illustrating the trunnion and associated pneumatics.
Figure 6:
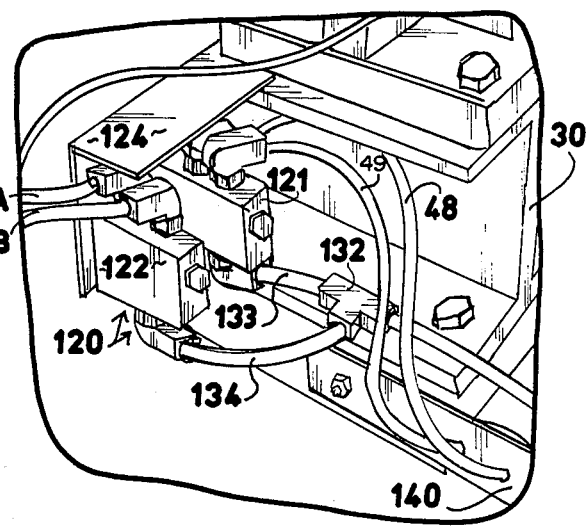
FIG. 6 is an enlarged, fragmentary, isometric view illustrating the pneumatic control apparatus.
Figure 7:
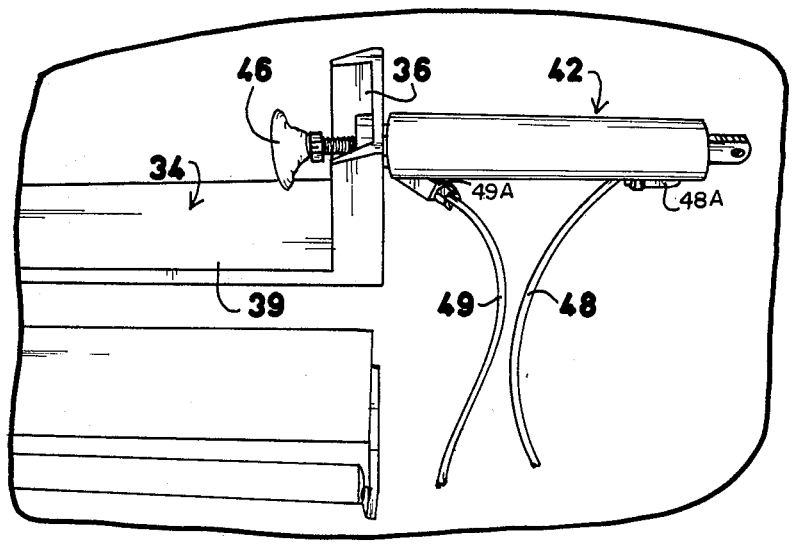
FIG. 7 is an enlarged, fragmentary, isometric view illustrating the pneumatic cradle end.

Turning now to FIGS. 5 and 6, the preferred pneumatic air supply system has been generally designated by the reference numeral 120. Essentially the system includes a pair of ClippardBrand, swiveled pneumatic switching valves. Both of the box-like, rigid valves 121 and 122 are mounted within a somewhat cubicle housing 124 secured to the front of the spacer web 93. A plurality of fittings, as viewed in FIG. 6 of the swivel type, are connected in the appropriate locations as viewed in FIG. 6. HP air is delivered via line 131 to a Tee 132 which transmits air into the base of the switches via lines 133, 134. The front toggle elements 121E, 122E (FIG. 4) project outwardly from the housing 124, and may be manually manipulated. Switch 122 controls the trunnion pneumatic actuator 75 vial lines 73A, 73B. The conventional pneumatic lines 48 and 49 previously discussed preferably leave switch 121 and are routed beneath the work surface 28 by routing brace 140.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A test fixture for gas meters or the like to facilitate meter repair, maintenance, inspection or similar service activities, said test fixture comprising:
    rigid, frame means for securing said fixture upon a supporting surface;
    rigid, generally U-shaped, rotatable cradle means associated with said frame means for temporarily receiving and retaining a meter or the like;
    power gripping means associated with said cradle means for automatically restraining said meter within said cradle to at least temporarily maintain said meter in a fixed position relative to said cradle;
    power trunnion means for controlling said cradle means;
    power locking means for activating said trunnion means to at least temporarily maintain said cradle means in a desired angular position relative to said supporting surface;
    said cradle means comprising a first generally vertical member securing said power gripping means, a second spaced apart generally vertical member secured to said power trunnion means, and a generally horizontal member extending between said first and second vertical members above said supporting surface;
    whereby a meter to be repaired or serviced may be manually inserted into said cradle, power locked therein, and then rotated to a desired position prior to cradle locking by said trunnion means for subsequent conveniently accessible repairs, service, maintenance, inspection or the like.

2. The test fixture as defined in claim 1 wherein said power gripping means comprises a pneumatic cylinder secured to said first vertical cradle means member in spaced-apart, generally parallel relation relative to said horizontal member.

3. The test fixture as defined in claim 2 wherein said power locking means comprises pneumatic cylinder means coupled to said trunnion means for selectively forcibly locking same.

4. The test fixture as defined in claim 3 including manually actuable pneumatic switch means for controlling said power gripping means and said trunnion power locking means.

5. The test fixture as defined in claim 4 wherein said frame means comprises means for securely mounting said trunnion means above said supporting surface.

6. The test fixture as defined in claim 3 wherein said trunnion means includes an internal housing having a first uniform diameter portion extending a major portion of its length, a rotatable shaft fitted within said first diameter portion, a second diameter portion of tapered dimensions, a locking cone adapted to be forced into said tapered dimensioned region in response to said trunnion power locking means, and retainer means preventing the lockup of said trunnion means.

7. The test fixture as defined in claim 6 wherein said retainer means comprises a pair of disc members fitted to said rotatable shaft.

8. The test fixture as defined in claim 7 wherein the disc members are semicircular and flat.

9. A test fixture for gas meters or the like to facilitate meter repair, maintenance, inspection or similar service activities, said test fixture comprising:
- rigid, frame means for securing said fixture upon a supporting surface;
- rigid, rotatable, generally U-shaped cradle means associated with said frame means for temporarily receiving and retaining a meter or the like to be serviced, said cradle means comprising first and second spaced apart, generally vertical members and a generally horizontal member extending between said first and second vertical members above said supporting surface;
- pneumatic power gripping means operatively associated with said cradle means first vertical member for automatically restraining said meter within said cradle between said vertical members to at least temporarily maintain said meter in a fixed position relative to said cradle, said power gripping means secured to said first vertical cradle means member in spacedapart, generally parallel relation relative to said horizontal member;
- trunnion means associated with said second cradle means vertical member for controlling said cradle means;
- pneumatic means for selectively activating said trunnion means to at least temporarily maintain said cradle means in a desired angular position relative to said supporting surface; and,
- manually actuable pneumatic switch means for controlling said power gripping means and said trunnion pneumatic locking means;
- whereby a meter to be repaired or serviced may be manually inserted into said cradle, power locked therein, and then rotated to a desired position prior to cradle locking by said trunnion means for subsequent conveniently accessible repairs, service, maintenance, inspection or the like.

10. The test fixture as defined in claim 9 wherein said frame means comprises means for securely mounting said trunnion means above said supporting surface.

11. The test fixture as defined in claim 10 wherein said trunnion means includes an internal housing having a first uniform diameter throughout a major portion of its length, a rotatable shaft fitted within said first diameter, a second diameter portion of tapered dimensions, a locking cone adapted to be forced into said tapered dimensioned region in response to said trunnion power locking means, and retainer means for preventing the lockup of said trunnion means.

12. The test fixture as defined in claim 11 wherein said retainer means comprises a pair of flat, semicircular disc members fitted to said rotatable shaft.

13. The test fixture as defined in claim 12 wherein said disc members abut said cone.

14. A test fixture for gas meters or the like to facilitate meter repair, maintenance, inspection or similar service activities, said test fixture comprising:
- rigid, frame means for securing said fixture upon a supporting surface;
- rigid, generally U-shaped cradle means associated with said frame means for temporarily receiving and retaining a meter or the like to be serviced, said cradle means comprising first and second spaced apart, generally vertical members and a generally horizontal member extending between said first and second vertical members above said supporting surface;
- pneumatic cylinder means for restraining said meter within said cradle between said vertical members to at least temporarily maintain said meter in a fixed position relative to said cradle, said cylinder means secured to said first vertical cradle means member in spaced-apart, generally parallel relation relative to said cradle horizontal member;
- trunnion means for controlling said cradle means, said trunnion means comprising an internal housing having a first uniform diameter throughout a major portion of its length, a second diameter portion of tapered dimensions, a locking cone adapted to be forced into said tapered dimensioned region, and retainer means for preventing the lockup of said trunnion means;
- pneumatic means for selectively activating said trunnion means to at least temporarily maintain said cradle means in a desired angular position relative to said supporting surface; and,
- manually actuable pneumatic switch means for controlling said power gripping means and said trunnion pneumatic activating means;
- whereby a meter to be repaired or serviced may be manually inserted into said cradle, power locked therein, and then rotated to a desired position prior to cradle locking by said trunnion means for subsequent conveniently accessible repairs, service, maintenance, inspection or the like.

15. The test fixture as defined in claim 14 wherein said retainer means comprises a pair of flat, semicircular disc members fitted to said rotatable shaft between same and said cone.

* * * * *